United States Patent [19]

Salmon

[11] Patent Number: 4,946,558
[45] Date of Patent: Aug. 7, 1990

[54] WATER DISTILLING APPARATUS

[75] Inventor: Michael E. Salmon, Spartanburg, S.C.

[73] Assignee: Terrill Designs, Inc., Spartanburg, S.C.

[21] Appl. No.: 282,026

[22] Filed: Dec. 9, 1988

[51] Int. Cl.⁵ .................. B01D 3/02; B01D 3/42; C02F 1/02

[52] U.S. Cl. .................. 202/167; 202/176; 202/180; 202/181; 202/185.5; 202/193; 202/196; 202/235; 202/206; 203/1; 203/2; 203/4; 203/10; 203/22; 203/27; 203/DIG. 8; 203/DIG. 18; 219/310; 219/312; 219/314

[58] Field of Search .......... 202/160, 166, 167, 176, 202/181, 180, 185.5, 185.6, 193, 196, 206, 235; 203/1, 2, 3, 10, 14, 4, 27, DIG. 18, 22, DIG. 8; 122/444; 219/310, 312, 314

[56] References Cited

U.S. PATENT DOCUMENTS

| | | |
|---|---|---|
| 797,255 | 8/1905 | Beers .................. 202/165 |
| 1,061,359 | 5/1913 | Daley et al. .......... 202/166 |
| 1,116,804 | 11/1914 | Daley .................. 202/166 |
| 1,268,233 | 6/1918 | Furman ................ 202/174 |
| 2,427,150 | 9/1947 | McCann ............... 219/312 |
| 3,055,810 | 9/1962 | Skow ................... 203/10 |
| 3,269,919 | 8/1966 | Baily et al. ........... 203/10 |
| 4,045,293 | 8/1977 | Cooksley .............. 203/10 |
| 4,110,170 | 8/1978 | Kirschman et al. .... 202/160 |
| 4,265,712 | 5/1981 | McLean ............... 202/166 |
| 4,339,307 | 7/1982 | Ellis, Jr. .............. 202/176 |
| 4,549,936 | 10/1985 | Erickson ............. 202/167 |
| 4,599,992 | 7/1986 | Harding ............... 219/310 |
| 4,601,789 | 7/1986 | Bjorklund ............. 202/167 |
| 4,687,550 | 8/1987 | Wong .................. 203/10 |
| 4,805,692 | 2/1989 | Palmer et al. ........ 203/10 |
| 4,861,435 | 8/1989 | Sweet, Jr. ............ 203/10 |

Primary Examiner—Virginia Manoharan
Attorney, Agent, or Firm—Brooks & Kushman

[57] ABSTRACT

A water distiller is provided which is used in conjunction with a hot water heater where normally wasted energy is used to preheat the hot water heater inlet. The distiller includes a heat storage tank, an evaporator tank having a water inlet, a heater and a steam outlet, and a first and second heat exchanger located within the heat storage tank. Steam generated in the evaporator tank passes through the first heat exchanger and condenses, forming distilled water. The heat rejected during condensation is absorbed within the heat storage tank. The second heat exchanger is used to preheat the water flowing to the hot water heater inlet by passing the water through the second heat exchanger on an as needed basis where it absorbs heat from the heat storage tank.

34 Claims, 2 Drawing Sheets

WATER DISTILLING APPARATUS

FIELD OF INVENTION

The present invention relates to water distilling devices, and more particularly to water distillers which recover waste heat.

BACKGROUND OF INVENTION

Residential water distillers have gained in popularity as a result of an increased concern about drinking water quality. By far, the most common type of residential distiller is the counter-top design generally shown in U.S. Pat. No. 4,052,267 to McFee. Countertop distillers, while inexpensive to purchase, consume large amounts of energy which is exhausted into the atmosphere. In the case of air conditioned homes, not only is the energy exhausted to the atmosphere wasted, but additional energy is also needed to cool the house. In order to minimize the energy dissipated into the room, there have been efforts to develop a water distiller which is cooled by tap water, which can then be poured down a drain. An example of such a water cooled distiller is shown in U.S. Pat. No. 4,342,625 to Dennison. Water distillers of both water and air cooled designs are relatively inefficient, since large amounts of waste heat are a necessary by-product of the distilling operation.

There have been efforts over the years to utilize waste heat generated from water distilling systems. U.S. Pat. No. 4,601,789 to Bjorklund discloses a combined water distiller/hot water heater, where the latent heat of evaporation released during the condensation process is used to heat hot water. U.S. Pat. No. 4,549,936 to Erickson discloses a rather complex distillation system which is attached to a hot water heater and uses a pair of pumps to generate a sub-atmospheric pressure region to cause the heated hot water to boil in the distiller without supplemental heating. U.S. Pat. No. 4,687,550 to Warren discloses a multichamber water distiller which generates atmospheric pressure waste water which is dumped down the sink drain or used as hot water for washing purposes.

SUMMARY OF INVENTION

The water distiller and distillation method of the present invention utilizes the waste heat generated during the distillation process to preheat hot water for a hot water heater. The distiller includes a heat storage tank, an evaporator tank having a water inlet, a heater and a steam outlet, and a first and second heat exchanger located within the heat storage tank. Water is boiled within the evaporator tank and the steam generated is cooled in the first heat exchanger providing distilled water and transferring the latent heat of condensation to the heat storage tank. The second heat exchanger has an inlet and an outlet, and water to be supplied to the hot water heater is circulated therethrough to be preheated as a result of absorbing energy from within the heat storage tank.

The preferred embodiment of the apparatus includes a reservoir for storing distilled water and appropriate level sensors in the reservoir and the heat storage tank to enable the apparatus to automatically operate, supplying distilled water on an as needed basis, and capture and storing the waste heat in the heat storage tank until such time as the conventional hot water system releases energy by supplying hot water to a consuming device.

OBJECTS, FEATURES AND ADVANTAGES OF INVENTION

One of the objects of the present invention is to provide a hot water distilling device which can be used in conjunction with a conventional hot water heater to recover energy which is normally wasted.

Another object of the present invention is to preheat water supplied to the hot water heater inlet while maintaining the water pressurized and totally isolated from the atmosphere.

Yet another object of the present invention is to increase the effective capacity of a hot water heater used in conjunction therewith.

Yet another object of the present invention is to isolate the heat storage tank from the conventional hot water heater, eliminating the problem of driving the hot water heater tank temperature above its preset upper limit, thereby creating temperatures and pressures higher than desired. Conversely, allowing the distillation cycle to be disrupted when the hot water heater reaches its desired limit would create situations where only small quantities of water could be distilled while maintaining the desired hysteresis band in the hot water heater controller.

A feature of the present invention is that the hot water heater and the distillation system can run totally independent during periods of abnormally low hot water use, high distilled water use, or conversely.

Another feature of the present invention is that the water distilling system can run totally automatically with little monitoring and maintenance.

Yet another feature of the invention is the apparatus' ability to periodically purge water having high sediment concentrations to prevent sediment buildup.

These and other objects, features and advantages of the present invention are described and shown in the accompanying drawings and description.

BRIEF DESCRIPTION OF PREFERRED EMBODIMENT

Figure 1:
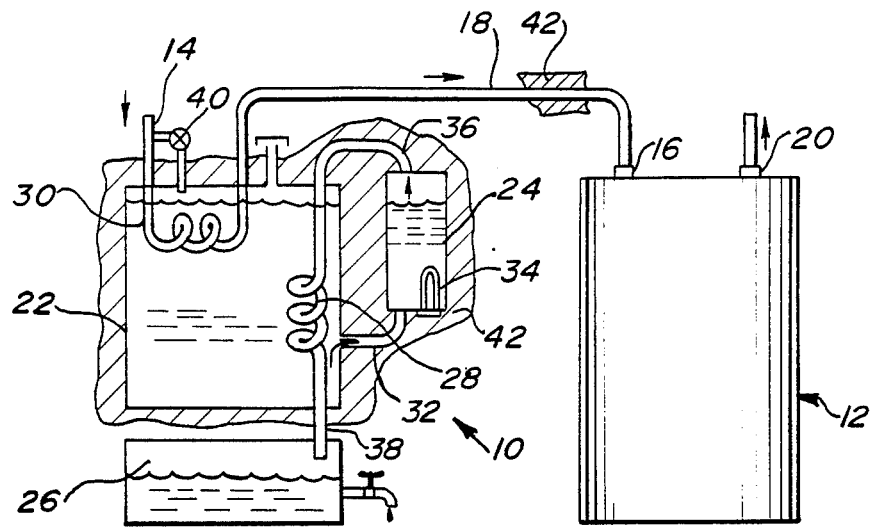
FIG. 1 is a simplified schematic diagram of the water distiller connected to a hot water heater.

A simplified schematic diagram of the preferred embodiment of the present invention is shown in FIG. 1. Distiller 10 is connected in series with hot water heater 12. Water enters the distiller at inlet line 14 where it is preheated before being transmitted to the hot water tank inlet 16 by pipe 18. Hot water heater 12 is of conventional design having a hot water outlet 20 which provides hot water to a building such as a residence or the like.

Distiller 10 is made up of five main components: heat storage tank 22, evaporator tank 24, distilled water reservoir 26, first heat exchanger 28 and second heat exchanger 30. Water substantially fills storage tank 22 and evaporator tank 24. Tube 32 connects the storage tank 22 to the bottom portion of evaporator tank 24. Tube 32 provides a storage tank outlet and evaporator tank inlet. Heater 34 is used to heat the water within the evaporator tank. Heater 34 is of a conventional electric tank heater design. Steam outlet tube 36 is connected to the upper portion of the evaporator tank and extends into the heat storage tank 22 where it is coupled to first heat exchanger 28. The steam flows through and condenses within the heat exchanger 28, forming distilled water, and the latent heat given off during the condensation process is dissipated into the water contained in heat storage tank 22. The distilled water exits the first heat exchanger and is transmitted to reservoir 26 by distilled water outlet tube 38 which sealingly projects through the storage tank wall.

First heat exchanger 28 is located in the lower region of the heat storage tank 22 where temperature tends to be the coldest and the maximum differential temperature between the water and the steam exists. Second heat exchanger 30 is oriented in the upper region of the heat storage tank where the temperature tends to be the hottest. Second heat exchanger 30 is coupled to hot water inlet 16 and outlet pipe 18. The inlet water for the hot water heater first passes through the second heat exchanger, absorbing heat from the water within the heat storage tank. The water within second heat exchanger 30 is maintained at normal hot water inlet pressure, and the liquid within the first heat exchanger is totally sealed from the contents of heat storage tank 22. When distilled water is formed, the level of the water within the heat storage tank and the evaporator will drop, and periodically inlet valve 40 will be opened refilling the system with water. An automatic control system regulating the operation of the distilling system is described in detail with reference to FIGS. 3 and 4.

In order to prevent heat losses to the atmosphere, the heat storage tank and evaporator tank are wrapped in insulation 42. A Fiberglass mat or other conventional insulating materials provide a means for insulating the tank to reduce heat loss to the atmosphere. Preferably, insulation will also cover outlet pipe 18 to prevent heat loss between the distiller and the hot water heater.

Figure 2:
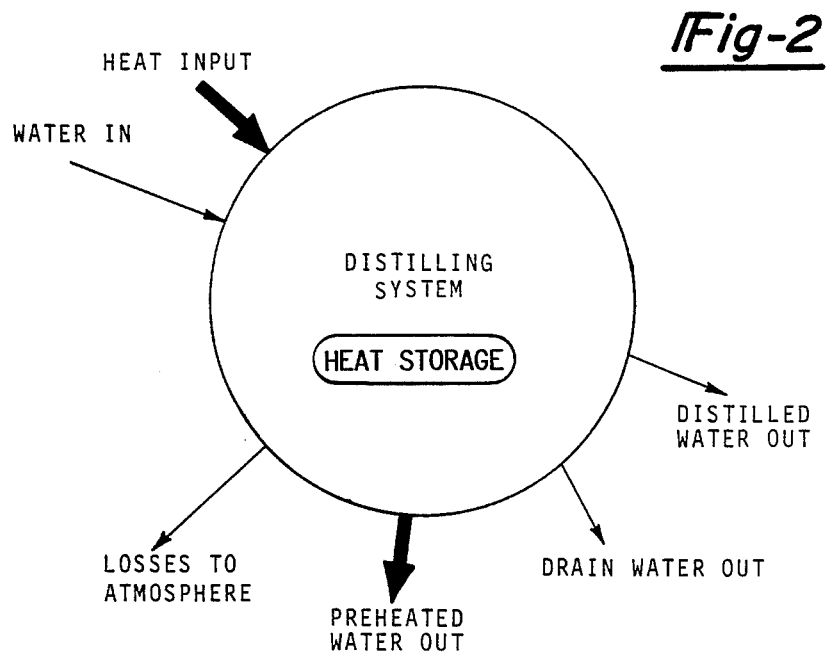
FIG. 2 is a sketch depicting energy inputs and outputs of the distilling system.

A diagram graphically illustrating the energy inputs and outputs of the distilling system is shown in FIG. 2. Energy enters the distiller in two forms. The primary energy input is the energy supplied to heater 34. Additionally, energy enters the system with incoming water. Energy leaves the system in a number of ways. First, the distilled water produced removes energy from the system. Since the distilled water exiting the first heat exchanger is at a higher temperature than water inlet, there is a net energy loss. In spite of the insulation, there will also be losses to the atmosphere. The majority of the energy exiting a properly functioning system will be through the preheated water supplied to the hot water heater. As described in more detail subsequently, there may also be periodic waste water discharges to remove sediments or dissipate excess heat when the distilled water consumption is high relative to hot water usage.

If one were to compare a present system to the counter-top design of McFee, the dramatic improvement in efficiency can be more fully appreciated. A conventional counter-top distiller ultimately dissipates all of its heat input to the atmosphere or the distilled water output. This worst case, is referred to as 100% energy loss. If one were to utilize the waste heat to preheat the water to be evaporated to 212°, only a 5–8% increase in efficiency could be obtained due to the relatively large magnitude of the latent heat evaporation to the specific heat of water. With a well insulated distilling system of the present design used in conjunction with a residential household hot water heater over 70% of the waste heat resulting from the distillation process can be utilized to preheat hot water. While this number may vary somewhat, dependent upon hot water and distilled water usage rates, the improvement in energy consumption is economically significant. With 8¢ per kilowatt/hour energy cost, the cost to produce a gallon of distilled water using a counter-top distiller in an un-air conditioned house is 23½¢, while with the present invention, distilled water can be produced at 8¢ per gallon.

Figure 3:
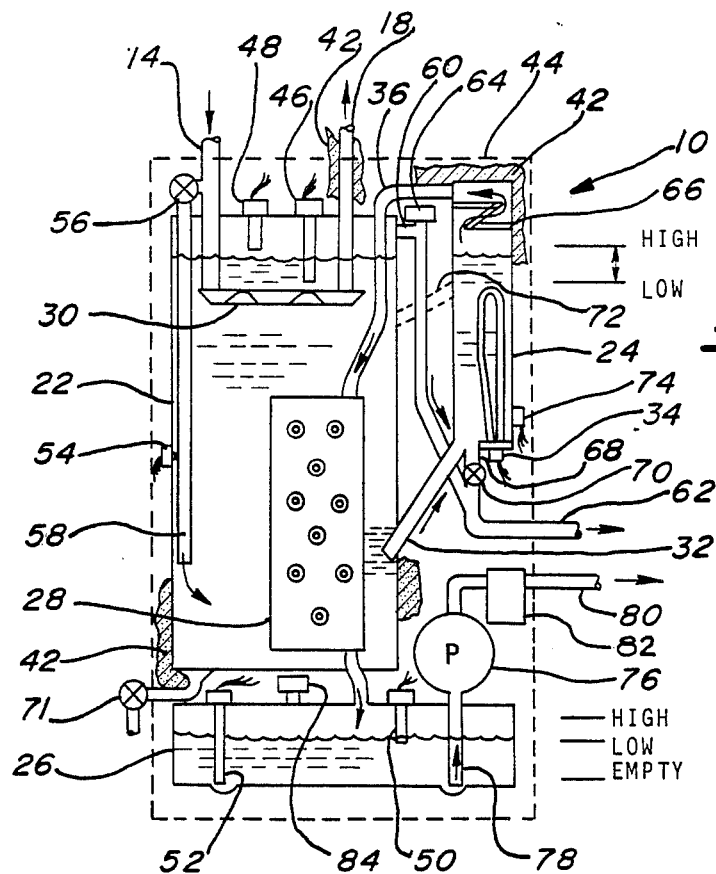
FIG. 3 is a detailed cross-sectional side elevation of the distilling apparatus.

A more detailed drawing of the preferred embodiment of the distiller 10 is shown in side elevation in FIG. 3. The distiller shown is a household size unit which can be packaged in a housing 44 standing a mere three feet tall. Heat storage tank 22 is formed of stainless-steel sheet and is generally rectangular in shape with a fifteen gallon capacity. Somewhat larger or smaller tank volumes can be utilized if greater efficiency or smaller size is desired. The fifteen gallon size, however, has been found to represent a good compromise. Evaporator tank 24 is likewise formed of a stainless-steel sheet. Evaporator tank 24 in the preferred embodiment has two gallon volume. Reservoir 26 is likewise formed of a stainless-steel sheet, and is generally rectangular in shape to maintain the compact size unit and has five gallon capacity. Reservoir tank size can be varied depending upon the user's needs, however, five gallons appears to be suitable for most residential applications. The various interconnecting tubes used in the distilling apparatus are also preferably formed of stainless-steel due to its resistance to corrosion. It should be appreciated that one or more of the reservoir or tanks in a system may be formed of alternative materials, such as plastic or the like, as dictated by production costs and marketing constraints.

The first and second heat exchangers 28 and 30 are of a generally planar fabricated sheet metal design. The heat exchangers are formed of two sheets of metal in spaced apart planar relation fastened about their peripheral edge and locally fastened at a number of spots to limit deformation. The planar heat exchanger design is preferred for economic reasons, but numerous alternative conventional heat exchanger designs can be utilized as well.

Distiller 10 shown in FIG. 3 includes the necessary sensors and valves to enable the distiller to operate completely automatically. The level of water within heat storage tank 22 is monitored by low limit switch 46 and high limit switch 48. The distilled water level in reservoir 26 is monitored by high limit switch 50 and low limit switch 52. The temperature of the water within heat storage tank 22 is monitored by a temperature sensor 54. Temperature sensor 54 is located near the central lower portion of heat storage tank 22 at the level of first heat exchanger 28. The flow of water entering the heat storage tank is controlled by a solenoid operated water inlet valve 56. Inlet tube 58 extends from inlet valve 56 to the lower portion of heat storage tank 22 so that the incoming cold water is introduced at the bottom of the tank so as not to unnecessarily reduce the temperature differential between the second heat exchanger 30 and the surrounding water.

Heat storage tank 22 is also provided with a overflow port 60 normally located well above the high water limit. The overflow port is connected to drain tube 62 having a vent 64 in its uppermost region. In the event of a failure of the heat storage tank high limit switch 48, overflow port 60 will allow water to escape, thereby preventing rupture of the heat storage tank. Vent 64 also enables any volatile hydrocarbons in the water to escape as the water within the heat storage tank is heated. In circumstances where the water within the heat storage tank becomes excessively hot so as to hinder the ability of the first heat exchanger to condense distilled water, hot water within the heat storage tank 22 may be dumped if the reservoir is excessively low.

Evaporator tank 24 in the preferred embodiment includes a baffle 66 which prevents water droplets from entering steam outlet tube 36. Baffle 66 is formed of a perforated sheet metal insert which substantially fills the evaporator tank cross-section. The evaporator tank is also provided with the lower outlet and a solenoid controlled purge valve 70. When purge valve 70 is opened, all or a portion of the water within the evaporator tank 24 is exhausted, taking with it sediment or any high mineral concentration water which may exist in the evaporator tank.

The purge valve and lower outlet are optional and may not be needed in most portions of the country where water mineral content is not excessive. In order to minimize sediment accumulation, tube 32 connecting heat storage tank 22 to evaporator tank 24 can be oriented diagonally, as shown, projecting downwardly from the lower portion of the evaporator tank to enable sediment to fall into the bottom of the storage tank where it can collect without hindering system performance until periodic cleaning. Tube 32 may have a substantially large cross-sectional area for operation in environments with high mineral content water. If the evaporator is designed to be used exclusively with a purge valve, tube 32 could be oriented much higher, as indicated by tube 72 shown in phantom outline, so that the water entering the evaporator tank is as hot as possible. The diagonal tube orientation prevents circulation through the tube due to temperature differential.

Drain valve 71 allows the heat storage tank to be flushed out periodically to remove accumulated sediment. A weak citric acid solution can be used to soften hard sediment in areas where mineral content is very high. Preferably, unsoftened water is used in order to prevent salt build-up. Inlet valve 56 may be connected to a source of unsoftened water (not shown) where salt build-up is a problem.

As an added safety feature, over temperature switch 74 is provided on the evaporator tank wall to ensure that heater 34 will be shut off if, for some reason, an excessive temperature is reached. Over temperature switch 74 is preferably set above boiling, approximately 230° so that it will only open in the event the heater is run when the evaporator tank is empty. Although only partially shown, it should be noted that the evaporator tank 24, heat storage tank 22, and outlet pipe 18 are completely surrounded by insulation 42 to minimize heat losses to the atmosphere.

In the preferred embodiment of the invention, the distiller will include a pump 76 used to pump distilled water from the reservoir 26 to a remote location in the home or building where the water is needed. Pump 76 has a pickup tube 78 which projects into the reservoir 26, and an outlet 80 which extends to one or more remote locations. The pump is provided with an internal pressure sensor and will turn itself on and off automatically when there is a demand for water. Filter 82 is provided in the outlet line to remove undesirable impurities. A preferred filter is of the silver impregnated activated carbon-type generally available commercially. To enable distilled water to be freely pumped from the reservoir, the reservoir is provided with a vent 84 which is opened to the atmosphere. Vent 84 also includes a silver impregnated activated charcoal filter to maintain the distilled water sanitary.

METHOD OF OPERATION

Figure 4:
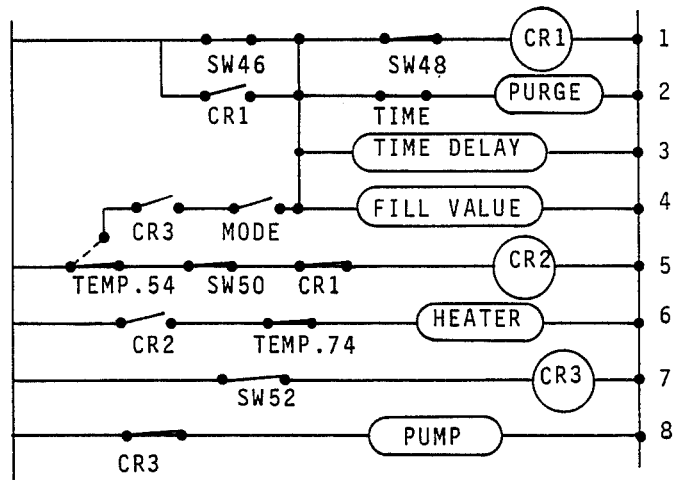
FIG. 4 is a electrical logic diagram of the distilling system controls.

A method of distiller operation is best described with reference to the electrical ladder diagram shown in FIG. 4. All of the switch and control relay positions are indicated as they would be when the heat storage tank and the reservoir were completely empty—a condition which would only exist at initial installation. Note that multiple pole, multiple throw relays may be shown in both the normally open or closed position in different parts of the diagram. When the control relay coil is energized, the control relay contacts originally shown in open position will close and the closed contacts will open.

The first line of the ladder diagram includes a switch 46, switch 48, and control relay coil CR1. When power is supplied to the system with the heat storage tank level below the limit switches 46 and 48, the control relay coil will be energized closing contacts CR1 shown on line 2. As long as the level in the storage tank is below the low level limit, switch 48 (SW48) will be normally closed and power will be supplied to purge valve 70 shown in line 2, the time delay shown on line 3, and the fill valve 56 shown on line 4. The time delay is set for a period sufficient to adequately purge the evaporator tank. The purge will run for a short time period, 10 or 30 seconds, at the start of each fill cycle. Purge time can be varied dependent on the mineral content of the water supply. After the time period has elapsed, time relay shown on line 2 opens closing purge valve 70.

Mode switch shown on line 4 can be placed in the normal mode or in the entertainment mode, described later. In the normal mode, the mode switch will be open as shown. Line 5 of the ladder diagram includes temperature switch 54 which is in the normally closed position when the water temperature is below some predetermined level—approximately 170°. Switch 50 (SW50) is the reservoir high limit switch and CR1 is the normally closed control relay 1 contacts. When the water reaches a sufficient height in the heat storage tank to open the level switches, control relay CR2 is energized, completing line 6 of the ladder diagram. When control relay contacts CR2 closes, and switch 74 is below its over temperature limit, heater 34 is energized and a heating cycle commences. Once sufficient water has been distilled, switch 50 shown in line 5 will open and a control relay coil CR2 will de-energize, shutting off the heater by opening contact CR2. In the event the reservoir level becomes very low, switch 52 on line 7 will close the energizing control relay coil CR3 and turning off the pump 76 by opening contact CR3 as indicated in lines 7 and 8 of the ladder diagram.

In the standard mode, mode switch shown in line 4 is open. If there is a very large demand for distilled water, the system will run until temperature sensor 54 reaches its activation temperature, after which time the heater will be turned off and no additional distilled water will be made. Pump 76 will continue to pump water from the reservoir until a low level limit is hit. In the standard mode, on rare occasions, distilled water may not be available until sufficient hot water has been used to lower the heat storage tank temperature. If one is not willing to have a rare interruption of distilled water availability and is willing to sacrifice some efficiency, the mode switch shown in line 4 of the diagram can be closed and in this position is referred to as the entertainment mode. When temperature switch 54 exceeds its activation temperature, temperature switch 54 will move to its alternative position shown in dotted line. When the reservoir becomes substantially empty, control relay coil 3 is activated, contact relay CR3 on line 5 closes, and the fill valve opens, causing the water level to rise above the high level limits and dumping the hot water out of overflow port and vent 60 until temperature drops sufficiently to close switch 54.

It should be appreciated that temperature switch 54 as well as the four level switches have some hysteresis or dead-band width. Temperature switch 54 may have 10–15 degrees of hysteresis. It is particularly desirable that reservoir high level switch 50 have a considerable amount of hysteresis so that the heater is not cycling on and off every time a small amount of distilled water is removed from the reservoir.

While the best modes for carrying out the invention have been described in detail, those familiar with the art to which the invention relates will recognize various alternative designs and embodiments for practicing the invention as defined by the following claims.

I claim:

1. A water distiller for use in conjunction with hot water heater, said distiller comprising:
   a heat storage tank for holding water;
   an evaporator tank for boiling water having a water inlet, heating means for boiling the water, and an outlet for steam;
   first heat exchanger means for condensing steam and transferring the heat generated thereby to the heat storage tank, said first heat exchanger means provided with a steam inlet coupled to the evaporator tank outlet, and a distilled water outlet; and
   second heat exchanger means for transferring heat from the heat storage tank to water provided to the hot water heater, said second heat exchanger means having an inlet coupled to a source of pressurized water, and an outlet coupled to the hot water heater.

2. The water distiller of claim 1 further comprising a distilled water reservoir having a reservoir outlet and an inlet for receiving distilled water from the first heat exchanger means outlet.

3. The water distiller of claim 2 further comprising a pump coupled to the distilled water reservoir outlet for providing a source of pressurized distilled water.

4. The water distiller of claim 2 further comprising reservoir level sensing means for providing an indication of the amount of distilled water in the reservoir, and control means for automatically regulating the operation of the distiller, said control means cooperating with the reservoir level sensing means and the heating means to automatically boil sufficient water within the evaporator tank to refill the reservoir upon the reservoir level dropping to a specified level.

5. The water distiller of claim 1 wherein said heat storage tank is generally vertically elongated having a lower region in which the first heat exchanger means is located and an upper region in which the second heat exchanger means is located.

6. The water distiller of claim 5 further comprising:
   insulation means for preventing heat loss from the heat storage tank and the evaporator tank;
   a heat storage tank temperature sensor;
   a solenoid-operated heat storage tank water inlet valve; and
   a heat storage tank overflow;
   wherein said control means further cooperates with the heat storage tank temperature sensor and heat storage tank water inlet valve to add cold water to the heat storage tank discharging hot water therefrom to reduce the heat storage tank temperature sufficient to maintain a temperature differential across the first heat exchanger which is adequate to condense the steam flowing therethrough.

7. The water distiller of claim 1 wherein the heat storage tank is provided with a water outlet coupled to the evaporator tank water inlet so that the water level in the heat storage tank and the evaporator tank are substantially equal.

8. The water distiller of claim 7 further comprising:
   a heat storage tank level sensor;
   a solenoid-activated heat storage tank water inlet valve; and
   control means for regulating the operation of the water distiller, said control means cooperating with the heat storage tank level sensor and the solenoid-activated heat storage tank water inlet valve to periodically add additional water to the heat storage tank to maintain the water level therein within a predetermined operating range.

9. The water distiller of claim 7 wherein said evaporator tank is further provided with a lower outlet oriented to collect any sediment forming in the tank, and a solenoid-operated purge valve cooperating with the evaporator tank lower outlet for periodically purging the evaporator tank to remove sediment and water having high mineral concentrations.

10. The water distiller of claim 7 further comprising:
    a heat storage tank level sensor;
    a solenoid-activated heat storage tank water inlet valve;
    a reservoir level sensor for monitoring the amount of distilled water therein; and
    control means for regulating the operation of the water distiller, said control means cooperating with the reservoir level sensor, and the heating means to make additional distilled water when the reservoir level drops below a predetermined level, said control means further cooperating with the heat storage tank level sensor and the solenoid-activated heat storage tank water inlet valve to periodically add additional water to the heat storage tank to maintain the water level therein within a predetermined operating range.

11. A water distiller for use in conjunction with a hot water heater, said distiller comprising:
    a heat storage tank for holding water having an inlet, and an outlet;
    an inlet valve cooperating with the heat storage tank inlet and a source of water;
    an evaporator tank for boiling water having a water inlet, heating means for boiling the water, and an outlet for steam;
    first heat exchanger means for condensing steam and transferring the heat generated thereby to the storage tank, said first heat exchanger means provided with a steam inlet coupled to the evaporator tank outlet, and a distilled water outlet; second heat exchanger means for transferring heat from the heat storage tank to water provided to the hot water heater, said second heat exchanger means having an inlet coupled to a source of pressurized water, and an outlet coupled to the hot water heater;

a reservoir having an outlet and an inlet for receiving the distilled water from the first heat exchanger means outlet;

a reservoir level sensor for sensing the water level therein; and control means for automatically regulating the operation of the distiller, said control means cooperating with the reservoir level sensor and the heating means to maintain the amount of distilled water in the reservoir within a predetermined range.

12. The water distiller of claim 11 wherein the evaporator tank is further provided with a lower outlet oriented to collect any sediment forming in the tank.

13. The water distiller of claim 12 further comprising a solenoid operated purge valve cooperating with lower outlet for periodically purging the evaporation tank to remove sediment and water having high mineral or solids concentrations.

14. The water distiller of claim 11 further comprising a pump coupled to the reservoir outlet for providing a source of pressurized distilled water.

15. The water distiller of claim 11 wherein said heat storage tank is provided with an overflow port which is vented to atmosphere to allow volatile hydrocarbons to escape.

16. A water distiller for use in conjunction with a hot water heater, said distiller comprising:
    a heat storage tank for holding water;
    an evaporator tank for boiling water having a water inlet, heating means for boiling the water, and an outlet for steam;
    first heat exchanger means for condensing steam and transferring the heat generated thereby to the heat storage tank, said first heat exchanger means provided with a steam inlet coupled to the evaporator tank outlet, and a distilled water outlet;
    second heat exchanger means for transferring heat from the heat storage tank to water provided to the hot water heater, said second heat exchanger means having an inlet coupled to a source of pressurized water, and an outlet coupled to the hot water heater; and
    a distilled water reservoir having a reservoir outlet and a reservoir inlet for receiving distilled water from the first heat exchanger means outlet.

17. The water distiller of claim 16 further comprising a pump coupled to the distilled water reservoir outlet for providing a source of pressurized distilled water.

18. The water distiller of claim 16 wherein said heat storage tank is generally vertically elongated having a lower region in which the first heat exchanger means is located and an upper region in which the second heat exchanger means is located.

19. The water distiller of claim 16 further comprising reservoir level sensing means for providing an indication of the amount of distilled water in the reservoir, and control means for automatically regulating the operation of the distiller, said control means cooperating with the reservoir level sensing means and the heating means to automatically boil sufficient water with the evaporator tank to refill the reservoir upon the reservoir level dropping to a specified level.

20. The water distiller of claim 19 further comprising:
    insulation means for preventing heat loss from the heat storage tank and the evaporator tank;
    a heat storage tank temperature sensor;
    a solenoid-operated heat storage tank water inlet valve; and
    a heat storage tank overflow;
    wherein said control means further cooperates with the heat storage tank temperature sensor and heat storage tank water inlet valve to add cold water to the heat storage tank discharging hot water therefrom to reduce the heat storage tank temperature sufficient to maintain a temperature differential across the first heat exchanger which is adequate to condense the steam flowing therethrough.

21. The water distiller of claim 16 wherein the heat storage tank is provided with a water outlet coupled to the evaporator tank water inlet so that the water level in the heat storage tank and the evaporator tank are substantially equal.

22. The water distiller of claim 21 further comprising:
    a heat storage tank level sensor;
    a solenoid-activated heat storage tank water inlet valve;
    a reservoir level sensor for monitoring the amount of distilled water therein; and
    control means for regulating the operation of the water distiller, said control means cooperating with the reservoir level sensor, and the heating means to make additional distilled water when the reservoir level drops below a predetermined level, said control means further cooperating with the heat storage tank level sensor and the solenoid-activated heat storage tank water inlet valve to periodically add additional water to the heat storage tank to maintain the water level therein within a predetermined operating range.

23. The water distiller of claim 21 further comprising a tube extending between the heat storage tank water outlet and the evaporator tank water inlet, said tube having at least a portion thereof upwardly inclined in the direction of the evaporator tank inlet to prevent circulation therethrough due to temperature differential.

24. The water distiller of claim 16 wherein said heat storage tank is provided with an overflow port which is vented to atmosphere to allow volatile hydrocarbons to escape.

25. A water distiller for use in conjunction with a hot water heater, said distiller comprising:
    a heat storage tank for holding water having an upper and lower region;
    an evaporator tank for boiling water having a water inlet, heating means for boiling the water, and an outlet for steam;
    first heat exchanger means for condensing steam and transferring the heat generated thereby to the heat storage tank, said first heat exchanger means provided with a steam inlet coupled to the evaporator tank outlet, and a distilled water outlet; and
    second heat exchanger means for transferring heat from the heat storage tank to the hot water heater, said second heat exchanger means located within the upper region of the heat storage tank and having an inlet coupled to a source of pressurized water; and an outlet coupled to the hot water heater.

26. The water distiller of claim 25 wherein the heat storage tank is provided with a water outlet coupled to the evaporator tank water inlet so that the water level in the heat storage tank and the evaporator tank are substantially equal.

27. The water distiller of claim 26 further comprising:
   a heat storage tank level sensor;
   a solenoid-activated heat storage tank water inlet valve; and
   control means for regulating the operation of the water distiller, said control means cooperating with the heat storage tank level sensor and the solenoid-activated heat storage tank water inlet valve to periodically add additional water to the heat storage tank to maintain the water level therein within a predetermined operating range.

28. The water distiller of claim 25 wherein said heat storage tank is provided with an overflow port which is vented to atmosphere to allow volatile hydrocarbons to escape.

29. A water distilling system comprising:
   a hot water heater having a water inlet and a hot water outlet;
   a heat storage tank for holding water having an upper and lower region;
   an evaporator tank for boiling water having a water inlet, heating means for boiling the water, and an outlet for steam;
   first heat exchanger means for condensing steam and transferring the heat generated thereby to the heat storage tank, said first heat exchanger means provided with a steam inlet coupled to the evaporator tank outlet, and a distilled water outlet;
   second heat exchanger means for transferring heat from the heat storage tank to the hot water heater, said second heat exchanger means located within the upper region of the heat storage tank and having an inlet coupled to a source of pressurized water, and an outlet coupled to the hot water heater inlet; and
   a distilled water reservoir having a reservoir outlet and a reservoir inlet for receiving distilled water from the first heat exchanger means outlet.

30. The water distilling system of claim 29 further comprising a pump coupled to the distilled water reservoir outlet for providing a source of pressurized distilled water.

31. The water distilling system of claim 29 further comprising reservoir level sensing means for providing an indication of the amount of distilled water in the reservoir, and control means for automatically regulating the operation of the distiller, said control means cooperating with the reservoir level sensing means and the heating means to automatically boil sufficient water within the evaporator tank to refill the reservoir upon the reservoir level dropping to a specified level.

32. The water distilling system of claim 29 wherein the heat storage tank is provided with a water outlet coupled to the evaporator tank water inlet so that the water level in the heat storage tank and the evaporator tank are substantially equal.

33. The water distilling system of claim 32 further comprising:
   a heat storage tank level sensor;
   a solenoid-activated heat storage tank water inlet valve;
   a reservoir level sensor for monitoring the amount of distilled water therein; and
   control means for regulating the operation of the water distiller, said control means cooperating with the reservoir level sensor, and the heating means to make additional distilled water when the reservoir level drops below a predetermined level, said control means further cooperating with the heat storage tank level sensor and the solenoid-activated heat storage tank water inlet valve to periodically add additional water to the heat storage tank to maintain the water level therein within a predetermined operating range.

34. The water distilling system of claim 29 wherein said heat storage tank is provided with an overflow port which is vented to atmosphere to allow volatile hydrocarbons to escape.

* * * * *

UNITED STATES PATENT AND TRADEMARK OFFICE
CERTIFICATE OF CORRECTION

PATENT NO. : 4,946,558

DATED : August 7, 1990

INVENTOR(S) : Michael E. Salmon

It is certified that error appears in the above-identified patent and that said Letters Patent is hereby corrected as shown below:

Column 7, line 27, Claim 1 (Appln. Page 14, Line 3, Claim 1), after "with" insert --a--.

Column 8, Line 65, Claim 11 (Amendment Dated February 7, 1990, Page 3, Line 10, Claim 10), after "outlet;" begin new paragraph.

Signed and Sealed this

Twenty-first Day of April, 1992

Attest:

HARRY F. MANBECK, JR.

*Attesting Officer*   *Commissioner of Patents and Trademarks*